United States Patent [19]

Russell et al.

[11] Patent Number: 5,506,789
[45] Date of Patent: Apr. 9, 1996

[54] LOAD EXTRACTION FAULT DETECTION SYSTEM

[75] Inventors: B. Don Russell, College Station; Carl L. Benner, Bryan, both of Tex.

[73] Assignee: The Texas A & M University System, College Station, Tex.

[21] Appl. No.: 401,644

[22] Filed: Mar. 10, 1995

Related U.S. Application Data

[63] Continuation of Ser. No. 138,413, Oct. 15, 1993, abandoned.

[51] Int. Cl.$^6$ ................................................ G06F 17/00
[52] U.S. Cl. ........................................ 364/492; 364/486
[58] Field of Search .................................. 364/483, 492, 364/487, 486; 324/534, 535, 642, 509

[56] References Cited

U.S. PATENT DOCUMENTS

| | | |
|---|---|---|
| 3,308,345 | 3/1967 | Warrington . |
| 3,515,943 | 6/1970 | Warrington . |
| 3,964,020 | 6/1976 | Dickerson ........................ 364/492 |
| 4,281,386 | 7/1981 | Kondow et al. . |
| 4,297,738 | 10/1981 | Lee . |
| 4,313,146 | 1/1982 | Lee . |
| 4,347,542 | 8/1982 | Calhoun . |
| 4,347,738 | 9/1982 | Sanderson . |
| 4,375,072 | 2/1983 | Rice ........................ 364/483 |
| 4,385,271 | 5/1983 | Kurtz ........................ 324/537 |
| 4,466,071 | 8/1984 | Russell, Jr. . |
| 4,470,092 | 9/1984 | Lombardi . |
| 4,529,929 | 7/1985 | Berggren ........................ 325/509 |
| 4,559,491 | 12/1985 | Saha . |
| 4,577,254 | 3/1986 | Yamaura ........................ 364/492 |
| 4,719,580 | 1/1988 | Nimmersjö . |
| 4,751,653 | 6/1988 | Junk et al. . |
| 4,752,886 | 6/1988 | Gareis . |
| 4,766,549 | 8/1988 | Schweitzer, III et al. . |
| 4,785,406 | 11/1988 | Lunderius et al. . |
| 4,795,983 | 1/1989 | Crockett et al. . |
| 4,800,509 | 1/1989 | Nimmersjö . |
| 4,812,995 | 3/1989 | Girgis et al. . |
| 4,851,782 | 7/1989 | Jerrings et al. . |
| 4,853,175 | 8/1989 | Book, Sr. . |
| 4,855,671 | 8/1989 | Fernandes . |
| 4,864,453 | 9/1989 | Bergman et al. . |
| 4,868,704 | 9/1989 | Cavero . |
| 4,871,971 | 10/1989 | Jerrings et al. . |
| 4,878,142 | 10/1989 | Bergman et al. . |
| 4,991,105 | 2/1991 | Pimental . |
| 5,003,486 | 3/1991 | Hendel . |

OTHER PUBLICATIONS

Carr, et al, "High Impedance Fault Detection on Primary Distribution Systems," Canadian Electrical Association Final Report, Project No. 78–75, 1979.

M. Aucoin, B. D. Russell, "Distribution High Impedance Fault Detection Utilizing High Frequency Current Components," *IEEE Transactions on Power Apparatus and Systems*, vol. PAS–101, No. 6, Jun., 1982, pp. 1596–1606.

M. Aucoin, B. D. Russell, "Detection of Distribution High Impedance Faults Using Burst Noise Signals Near 60 Hz," *IEEE Transactions on Power Delivery*, vol. PWRD–2, No. 2, Apr. 1987, pp. 342–348.

B. D. Russell, B. M. Aucoin, T. J. Talley, "Detection of Arcing Faults on Distribution Feeders," EL–2757, Research Project 1285–3, Final Report, Dec., 1982.

(List continued on next page.)

*Primary Examiner*—Ellis B. Ramirez
*Attorney, Agent, or Firm*—Flehr, Hohbach, Test, Albritton & Herbert

[57] ABSTRACT

A method and apparatus are provided for detecting an arcing fault on a power line carrying a load current. The apparatus monitors, compiles and analyzes sample parameters taken from successive cycles of the power line load signal indicative of power flow and possible fault events on the line, such as voltage or load current. The analyzed sample parameter is then used to determine a normal parameter corresponding to a normal load pattern for the line. The normal load parameter is extracted from the compiled sample parameter data, and the resulting difference signal waveform has a magnitude value which changes in amplitude corresponding to the load-extracted data which is used to determine whether a fault exists on the power line.

9 Claims, 7 Drawing Sheets

OTHER PUBLICATIONS

Carl Lee Benner, "An Algorithm for Faulted Phase and Feeder Selection Under High Impedance Fault Conditions," A Thesis Submitted to the Graduate College of Texas A&M University, Aug., 1988.

Patrick Wayne Carswell, "The Detection of High Impedance Faults Using Random Fault Behavior," A Thesis Submitted to the Graduate College of Texas A&M University, Aug., 1988.

C. Benner, P. Carswell, B. D. Russell, "Improved Algorithm for Detecting Arcing Faults Using Random Fault Behavior," *Electric Power Systems Research*, vol. 17, 1989, pp. 49–56.

"Detection of High Impedance Faults," EPRI Report, EL–2413, Prepared by Power Technologies, Inc., Jun. 1982.

"High Impedance Fault Detection Using Third Harmonic Current," EPRI Report, EL–2430, Prepared by Hughes Aircraft Company, Jun. 1982.

"The Characterization of High Impedance Faults," Prepared by PowerTech Labs, Inc., Canadian Electrical Association, Project 038 D 721, Jun. 1992.

M. Al–Dabbagh, R. Daoud, R. Coulter, "Improved Microprocessor Based Feeder Earth Fault Protection Using Pattern Recognition," Fourth International Confernce on Developments in Power System Protection, Edinburgh, UK, Apr. 11–13, 1989.

M. Aucoin, "Status of High Impedance Fault Detection," *IEEE Transactions on Power Apparatus and Systems*, vol. PAS–104, No. 3, Mar. 1985, pp. 638–644.

B. M. Aucoin, J. Zeigler, B. D. Russell, "Feeder Protection and Monitoring System, Part I: Design, Implementation and Testing," *IEEE Transactions on Power Apparatus and Systems*, vol. PAS–104, No. 4, Apr. 1985, pp. 873–879.

B. M. Aucoin, J. Zeigler, B. D. Russell, "Feeder Protection and Monitoring System, Part II: Staged Fault Test Demonstration," *IEEE Transactions on Power Apparatus and Systems*, vol. PAS–104, No. 6, Jun. 1985, pp. 1456–1462.

H. J. Calhoun, M. T. Bishop, C. H. Eichler, R. E. Lee, "Development and Testing of an Electro–Mechanical Relay to Detect Fallen Distribution Conductors," *IEEE Transactions on Power Apparatus and Systems*, vol. PAS–101, No. 6, Jun. 1982, pp. 1643–1650.

J. Carr, "Detection of High Impedance Faults on Multi–Grounded Primary Distribution Systems," *IEEE Transactions on Power Apparatus and Systems*, vol. PAS–100, No. 4, Apr. 1981, pp. 2008–2016.

R. D. Christie, H. Zadehgol, M. M. Habib, "High Impedance Fault Detection in Low Voltage Networks," IEEE Power Engineering Society Summer Meeting, Seattle, Washington, Jul. 1992, IEEE Paper No. 92 SM 507–4 PWRD.

J. R. Dunki–Jacobs, "The Effects of Arcing Ground Faults on Low–Voltage System Design," *IEEE Transactions on Industry Applications*, vol. IA–8, No. 3, May/Jun. 1972, pp. 223–230.

S. D. Ebron, D. L. Lubkeman, M. White, "A Neural Network Approach to the Detection of Incipient Faults on Power Distribution Feeders," *IEEE Transactions on Power Delivery*, vol. 5, No. 2, Apr. 1990, pp. 905–912.

A. E. Emanuel, D. Cyganski, J. A. Orr, "High Impedance Fault Arcing on Sandy Soil in 15kV Distribution Feeders: Contributions to the Evaluation of the Low Frequency Spectrum," *IEEE Transactions on Power Delivery*, vol. 5, No. 2, Apr. 1990, pp. 676–684.

A. A. Girgis, W. Chang, E. B. Makram, "Analysis of High–Impedance Fault Generated Signals Using a Kalman Filtering Approach," *IEEE Transactions on Power Delivery*, vol. 5, No. 4, Nov. 1990, pp. 1714–1720.

C. Huang, H. Chu, M. Chen, "Algorithm Comparison for High Impedance Fault Detection Based on Staged Fault Test," *IEEE Transactions on Power Delivery*, vol. 3, Oct. 1988, pp. 1427–1434.

D. I. Jeerings, J. R. Linders, "A Practical Protective Relay for Down–Conductor Faults," *IEEE Transactions on Power Delivery*, vol. 6, Apr. 1991, pp. 565–571.

J. R. Linders, D. I. Jeerings, "Down–Conductor Detection: Theory and Practice," Texas A & M Conference for Protective Relay Engineers, College Station, Texas, Apr. 1993.

D. I. Jeerings, J. R. Linders, "Ground Resistance–Revisited," *IEEE Transactions on Power Delivery*, vol. PWRD–4, No. 2, Apr. 1989, pp. 949–956.

D. I. Jeerings, J. R. Linders, "Unique Aspects of Distribution System Harmonics Due to High Impedance Ground Faults," *IEEE Transactions on Power Delivery*, vol. 5, Apr. 1990, pp. 1086–1092.

A. T. Johns, P. Agrawal, "New Approach to Power Line Protection Based Upon the Detection of Fault Induced High Frequency Signals," *IEEE Proceedings, Part C, Generation, Transmission and Distribution*, vol. 137, No. 4, Jul. 1990, pp. 307–313.

R. H. Kaufmann, J. C. Page, "Arching Fault Protection for a Low Voltage Power Distribution System–Nature of the Problem," *AIEE Transactions on Power Apparatus and Systems*, Jun. 1960, pp. 160–167.

C. J. Kim, B. D. Russell, "A Learning Method for Use in Intelligent Computer Relays for High Impedance Faults," *IEEE Transactions on Power Delivery*, vol. 6, No. 1, Jan. 1991, pp. 109–115.

C. J. Kim, B. D. Russell, K. Watson, "A Parameter–Based Process for Selecting High Impedance Fault Detection Techniques Using Decision Making Under Incomplete Knowledge," *IEEE Transactions on Power Delivery*, vol. 5, No. 3, Jul. 1990, pp. 1314–1320.

C. J. Kim, B. D. Russell, "Harmonic Behavior During Arching Faults on Power Distribution Feeders," *Electric Power Systems Research*, vol. 14, No. 3, Jun. 1988, pp. 219–225.

C. J. Kim, B. D. Russell, "Classification of Faults and Switching Events by Inductive Reasoning and Expert System Methodology," *IEEE Transactions on Power Delivery*, vol. 4, Jul. 1990, pp. 1631–1637.

C. J. Kim, B. D. Russell, "High Impedance Fault Detection System Using an Adaptive Element Model," *IEEE Proceedings–C, vol. 140, No. 2, Mar. 1993, pp. 153–159.*

W. H. Kwon, G. W. Lee, Y. M. Park, M. C. Yoon, M. H. Yoo, "High Impedance Fault Detection Utilizing Incremental Variance of Normalized Even Order Harmonic Power," *IEEE Transactions on Power Delivery*, vol. 6, Apr. 1991, pp. 557–563.

R. E. Lee, M. T. Bishop, "Performance Testing of the Ratio Ground Relay on a Four–Wire Distribution Feeder," *IEEE Transactions on Power Appartatus and Systems*, vol. PAS–102, No. 9, Sep. 1983, pp. 2943–2948.

M. Narendorf, B. D. Russell, M. Aucoin, "Microcomputer Based Feeder Protection and Monitoring System–Utility Experience," *IEEE Transactions on Power Delivery*, vol. PWRD–2, No. 4, Oct. 1987, pp. 1046–1052.

R. M. Reedy, "Minimize the Public Risk of Downed Conductors," *Electrical World*, Sep. 1989, pp. S–36, 38, 40.

B. D. Russell, R. P. Chinchali, "A Digital Signal Processing Algorithm for Detecting Arcing Faults on Power Distribution Feeders," *IEEE Transactions on Power Delivery*, vol. PWRD-3, No. 4, Jan. 1989, pp. 132–140.

B. D. Russell, R. P. Chinchali, C. J. Kim, "Behaviour of Low Frequency Spectra During Arcing Fault and Switching Events," *IEEE Transactions on Power Delivery*, vol. 3, No. 4, Oct. 1988, pp. 1485–1491.

B. D. Russell, K. Mehta, R. P. Chinchali, "An Arcing Fault Detection Technique Using Low Frequency Current Components–Performance Evaluation Using Recorded Field Data," *IEEE Transactions on Power Delivery*, vol. PWRD-3, No. 4, Oct. 1988, pp. 1493–1500.

B. D. Russell, K. Watson, "Power Substation Automation Using a Knowledge Based System–Justification and Preliminary Field Experiments," *IEEE Transactions on Power Delivery*, vol. PWRD-2, No. 4, Oct. 1987, pp. 1090–1095.

A. F. Sultan, G. W. Swift, D. J. Fedirchuk, "Detection of High Impedance Arcing Faults Using a Multi-Layer Perceptron," *IEEE Transactions on Power Delivery*, vol. 7, No. 4, Oct. 1992, pp. 1871–1877.

T. J. Talley, "Power Spectrum Estimates of High Frequency Noise Generated by High Impedance Arcing Faults on Distribution Systems," Master of Science Thesis, Texas A&M University, Dec. 1979.

A. R. van C. Warrington, *Protective Relays: Their Theory and Practice,* vol. 2, London: Chapman and Hall, 1969, pp. 340–347 only.

A. C. Westrom, A. P. Sakis Melliopoulos, G. J. Cokkinides, "Open Conductor Detector System," *IEEE Transactions on Power Delivery*, vol. 7, Jul. 1992, pp. 1643–1650.

LOAD EXTRACTION FAULT DETECTION SYSTEM

This invention was made with government support under Grant No. ECS-8715363, awarded by the National Science Foundation (NSF). The U.S. government may have certain rights in this invention.

This is a continuation of application Ser. No. 08/138,413 filed Oct. 15, 1993 now abandoned.

BACKGROUND OF INVENTION

The present invention relates generally to a load current analysis system for use with an electrical utility power system, and more particularly to a load extraction fault detection system for detecting high impedance, low current arcing faults on the power system. Arcing faults may be caused by, for example, downed, broken, tangled or dangling power lines, trees contacting the power lines, and various overcurrent fault situations.

Arcing faults are more difficult to detect than permanent overcurrent faults, which for instance, occur when a transformer fails. Most conventional overcurrent protection devices, such as fuses, reclosures, relays and the like, have time delays which prevent a temporary fault from de-energizing the power line. Only if the overcurrent fault persists does such a protection device de-energize the power line. Some arcing faults may initialize the timing circuits of the overcurrent protection devices but, by the end of the time delay, the high impedance nature of the fault limits the fault current to a low value. Such overcurrent protection devices cannot distinguish this low fault current from the levels of current ordinarily drawn by customers; hence, the line may remain energized even though a dangerous arcing fault exists on the power line.

Other methods of detecting arcing faults have focused on comparing voltage and current signals. For instance, U.S. Pat. No. 4,871,971 to Jeerings et al. ("Jeerings") detects an abnormality on an electric power system based upon the phasor relationship between the fundamental voltage and a harmonic current, specifically, the third harmonic. Jeerings detects a high impedance fault based upon a predetermined change in this phasor relationship. Thus, Jeerings lacks any dynamic capability to track the actual line current.

To implement Jeerings' method requires expensive filtering to produce the third harmonic component. Moreover, Jeerings uses phasor comparisons which are calculated over relatively long periods of time, yielding a slow response to a potentially dangerous situation. For example, Jeerings compares the phasor relationships determined over a short term (up to 5 seconds) with those derived over a relatively long term (10 seconds to 10 minutes).

Another deficiency of Jeerings is that the harmonic current is usually not related to the voltage or current levels of the power line during a high impedance fault. Instead, the current drawn by an arcing fault is often dependent on the environmental conditions at the fault site, such as conductor movement, the presence of ionized gases and/or soil in the current path, and the type of grounding surface in contact with the live conductor. Clearly Jeerings lacks any adaptability to accommodate such rapidly changing environmental situations at a fault site.

Another extraction technique for detecting high impedance faults was proposed by J. Carr and G. L. Hood in an article entitled, "High Impedance Fault Detection on Primary Distribution Systems," Canadian Electrical Association Final Report, Project No. 78-75, 1979. Carr and Hood eliminate load current from the total current during a fault condition using analog circuitry known as a "wash-out" filter. Basically, Carr and Hood use a frequency filtering technique, i.e., a high pass filter, which can inherently lead to inaccuracies. The Carr and Hood technique deals only with RMS current values, rather than with waveforms.

Thus, a need exists for an improved load extraction arcing fault detection system for electrical power utilities which is directed toward overcoming, and not susceptible to, the above limitations and disadvantages.

SUMMARY OF THE INVENTION

The present invention encompasses a load extraction fault detection system which detects faults by extracting the load component from the line current waveform to provide a remaining fault current component for analysis. The preferred analysis comprises determining a point-by-point difference in the time domain between the present current signal and its long-term average. The illustrated embodiment of the present invention dynamically tracks the actual line current to account for changing load conditions when determining whether a high impedance fault has occurred, which advantageously minimizes unnecessary power service interruptions and outages.

According to one aspect of the present invention, a method is provided for analyzing faults occurring on a power line. In a monitoring step, a sample load current flowing through the power line is monitored. In an analyzing step, the sample load current is analyzed over time. In a determining step, a normal load current pattern is determined based on the sample load current. In an extracting step, the normal load current pattern is extracted from the sample load current to determine whether a fault exists on the power line.

According to one aspect of the present invention, an apparatus is provided for detecting arcing faults on a power line carrying a line current. The apparatus includes a sensor for monitoring the line current, and a sampler responsive to the sensor for generating data samples based on the line current. An analyzer analyzes the data samples, and a determining portion determines a normal load pattern based on the analyzed data samples. The apparatus also has a comparator for comparing the data samples to the normal load pattern to determine whether a fault exists on the power line.

An overall object of the present invention is to provide a fault detection system for detecting faults that are too small to be properly recognized by conventional overcurrent protection systems.

A further object of the present invention is to provide a fault detection system for accurately identifying dangerous high impedance arcing faults.

Still another object of the present invention is to provide a fault detection system which is faster, more economical, and more reliable than the earlier systems.

The present invention relates to the above features and objects individually as well as collectively. These and other objects, features and advantages of the present invention will become apparent to those skilled in the art from the following description and drawings.

DETAILED DESCRIPTION OF A PREFERRED EMBODIMENT

Figure 1:
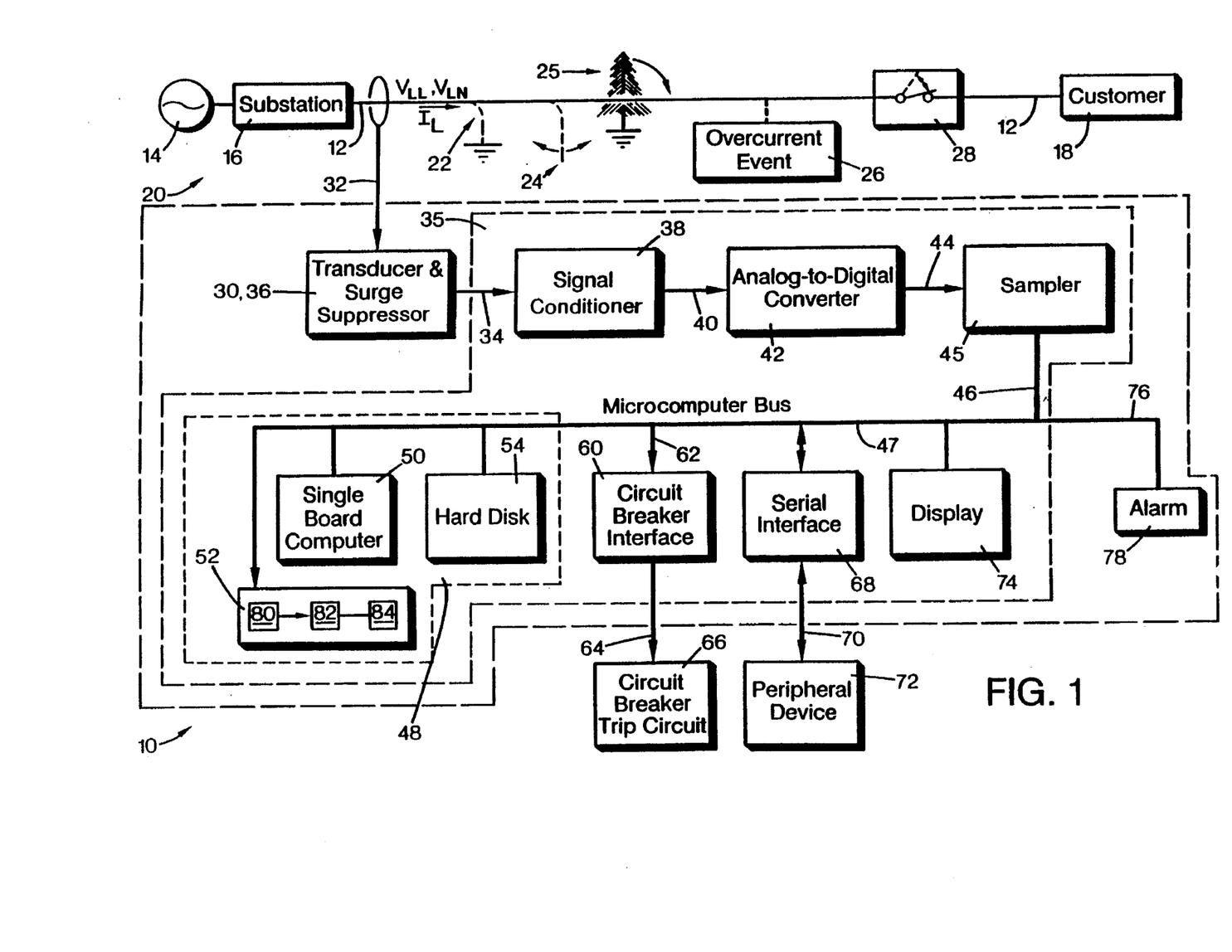
FIG. 1 is a schematic block single line diagram of one form of a load extraction fault detection system of the present invention.

Referring to FIG. 1, a load extraction fault detection system or detector 10 constructed in accordance with the present invention is shown coupled to detect faults, such as high impedance, low current, arcing faults on a feeder line 12. The load extraction fault detector 10 may be operated alone, or as a portion of a higher level fault analysis scheme, such as the one disclosed in one of the coinventors' other concurrently filed patent applications, entitled, "Expert System." The feeder line 12 receives power from an AC power source, such as a generating station 14, through a substation 16. Other feeder lines (not shown) may also receive power from the generating station 14 and exit the substation 16. The feeder line 12 delivers power from the substation 16 to a variety of utility customers, such as customer 18.

Altogether, the generating station 14, the substation 16, and feeder line 12 illustrate a portion of an electrical utility's power system 20. Most typical power systems generate and distribute power using a three phase system. Thus, the feeder line 12 may deliver power over three phase lines, known as phases A, B, and C. The feeder line 12 may also have a neutral conductor. For convenience, power system 20 illustrated herein is such a three phase system.

Between the substation 16 and the customer 18, the feeder line 12 may be subjected to a variety of different types of events, activities and faults. Some typical faults are illustrated in FIG. 1, specifically, an arcing fault caused by a downed conductor 22, a dangling conductor 24, or momentary contact of a tree 25 or other object with the feeder line 12. The system may also be subject to other disrupting events, such as an overcurrent event 26, and a switching event 28 performed by a conventional recloser or the like.

The detector 10 includes a monitoring device, such as a sensor or transducer 30, coupled to feeder line 12 as indicated schematically by line 32. The term "monitoring device" is broadly defined herein to include sensing devices, detecting devices, and any other structurally equivalent device or system understood to be interchangeable therewith by those skilled in the art. The illustrated transducer 30 senses or monitors a line parameter, such as line voltage (line-to-line $V_{LL}$ or line-to-neutral $V_{LN}$), or load current $I_L$ flowing through feeder line 12.

For instance, in response to monitoring the load current $I_L$, the transducer 30 produces a line parameter signal, here, a load current signal 34, from which the fault components of the parameter be determined. The transducer 30 may be a conventional transducer or an equivalent device, such as a multiple phase current measuring device typically having one current transformer per phase, plus one on the neutral conductor, of the feeder line 12. If instead voltage is the selected parameter of monitoring, there are a variety of commercially available voltage transducers known to those skilled in the art that would be suitable. Of course, both voltage and current could be monitored if desired. It is also conceivable that other parameters of the line current may be measured, with suitable transducers selected to accomplish the desired monitoring, for instance, power factor.

The detector 10 may also include surge protection, for example, a surge suppressor or protector 36. The surge protector 36 may be supplied either with the transducer 30, as illustrated, or as a separate component. The surge protector 36 protects the detector 10 from power surges on the feeder line 12, such as those caused by lightning strikes or the like.

A controller 35 receives the load current signal 34 from transducer 30. The controller 35 may include a signal conditioner 38 for filtering and amplifying the load current signal 34 to provide a clean conditioned load current signal 40. Preferably, the signal conditioner 38 includes a low-pass filter suitable for satisfying the Nyquist criteria of sampling, known to those skilled in the art.

The signal conditioner 38 may also amplify the load current signal 34 for the appropriate gain required by an analog-to-digital (A/D) converter 42. For example, the current flowing on the power system 20 may have a dynamic range of 10 to 10,000 Amps, so the signal conditioner 38 appropriately scales these signals for conversion by the A/D converter 42 from an analog signal 40 into a digital load current signal 44.

When the transducer 30 is an analog device, the controller 35 includes the illustrated discrete A/D converter 42. The transducer 30 may also be implemented as a digital device which incorporates the signal conditioning function of conditioner 38 and the analog-to-digital conversion function of the A/D converter 42.

Additionally, the controller 35 may include a power parameter sampling device or sampler 45. The illustrated sampler 45 samples the digitized current signal 44 at selected intervals to provide an accurate representation of the load level due to rapidly changing conditions, such as during arcing faults.

In the illustrated embodiment, the sampler 45 provides a sampler signal 46 corresponding to the sampled line parameter values, such as line current $I_L$ or voltage (line-to-line $V_{LL}$ or line-to-neutral $V_{LN}$). The sampler signal 46 is supplied via a microcomputer bus 47 to a computing device, such as a microcomputer system 48. The illustrated microcomputer system 48 has a computer, which may be a single-board computer 50, coupled with a memory device, for instance, a random-access memory 52, and a data storage device, such as a hard disk 54. A suitable microcomputer system 48 may include a conventional personal computer or any other equivalent device known to be interchangeable by those skilled in the art.

The sampler 45 may measure the line parameter values on a time-domain basis, or the sampling function may be conducted by microcomputer system 48. Other details of the sampling process are described below. It is apparent to those skilled in the art that other variations of these sensing and sampling functions are also possible. For instance, line-to-line voltages $V_{LL}$ or line-to-neutral voltages $V_{LN}$ may be monitored, sampled and analyzed instead of, or in addition to, monitoring of the line current $I_L$.

The controller 35 has a circuit breaker interface 60 for receiving a trip command signal 62 from the computer 50 via bus 47. In response to the trip command signal 62, the interface 60 sends a trip signal 64 to a circuit breaker trip circuit 66. The trip circuit 66 drives a circuit breaker (not shown) which may be located locally at substation 16, or remotely, such as a recloser on a pole-top, to de-energize ("trip") feeder line 12.

The controller 35 may also include an optional serial interface 68, such as a modem for sending and receiving a peripheral device signal 70 over a telephone network. The interface 68 may communicate with an external peripheral device 72, such as a remotely located power distribution control center. In some systems, the peripheral device 72 may provide a remote input to the detector 10 via serial interface 68, for example, to override previous programming of the detector 10, such as initial settings, sampling rates, a sampling time period, and the like.

Controller 35 may also include an output device, such as a visual display device 74, or a printer. Preferably, the output display 74 provides a visual indication of the status of detector 10, feeder line 12, and the previous operating conditions of the feeder line. The controller 35 may also provide an alarm signal 76 via bus 47 to an alarm 78, which may be visual, audible, or both.

In the utility industry, it is generally accepted that power distribution involving voltage levels below 25 kV are problematic in the area of high impedance fault detection. The problems associated with this detection are due in part to the insufficiency of the voltage level at the point of fault, which fails to sustain power frequency follow-through arcing. Thus, the arcing stops before fuses are able to blow and before overcurrent protection devices are able to operate. Alternatively, the fault current may be too low in magnitude or too intermittent to operate these overcurrent protection devices. Of course, this same difficulty may also be encountered in distribution systems operating at voltage levels of 25 kV and above.

Typically, the fault current magnitude of a high impedance fault on the distribution system 20 is dependent upon the various environmental conditions at the fault site. For example, the current magnitude will fluctuate as the resistance of the current path changes due to the presence of ionized gases, soil particles and the like in the current path, as well as the type of grounding surface in contact with the live conductor. Thus, the fault current magnitude is simply not related to the voltage or current load levels of the line, nor to the rated capacities of the distribution system.

OPERATION

Figure 2A:
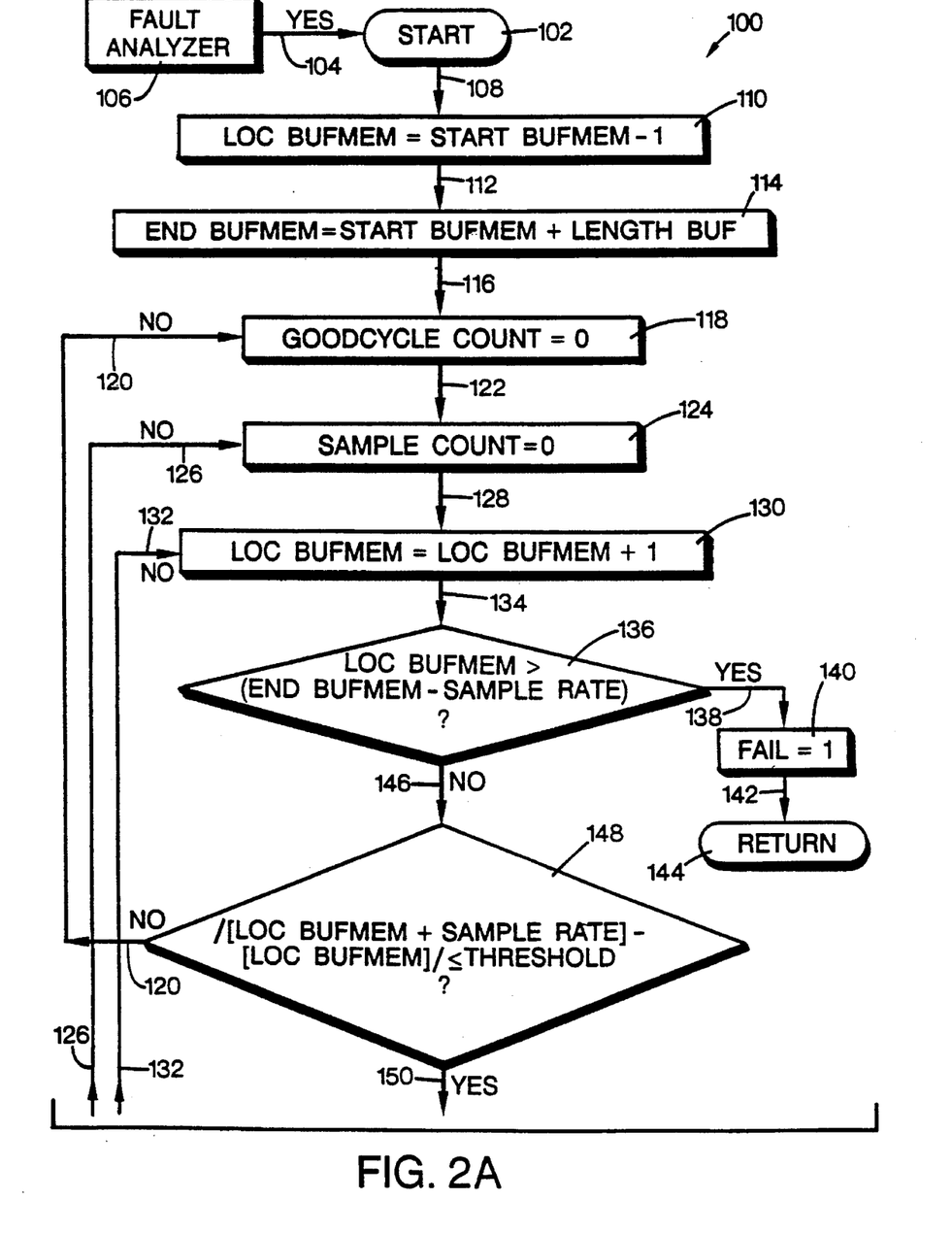
FIGS. 2A, 2B and 2C, referred to herein collectively as "FIG. 2," are adjoining portions of a flow chart illustrating one manner of operating the fault detection system of FIG. 1.
Figure 2B:
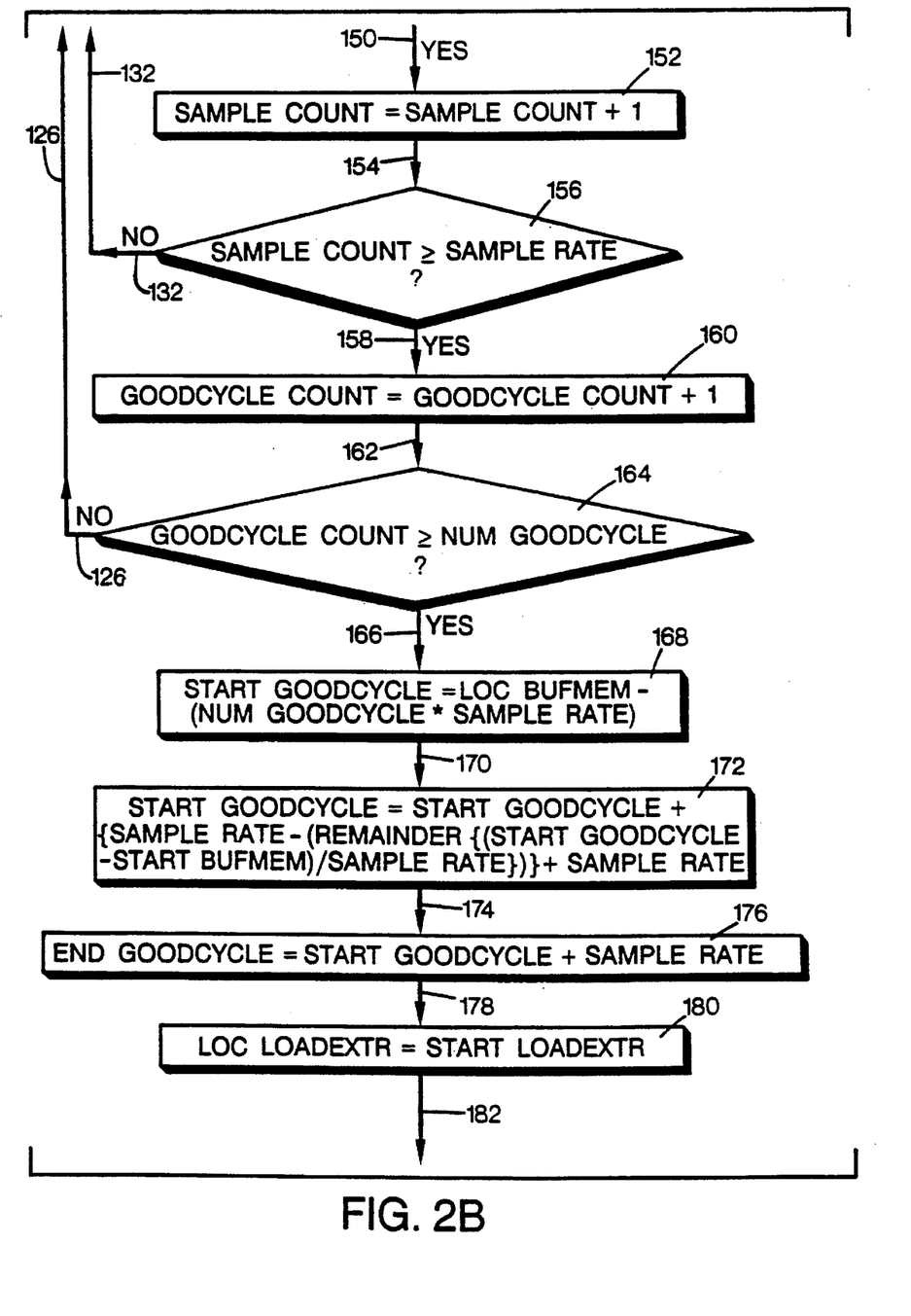
Figure 2C:
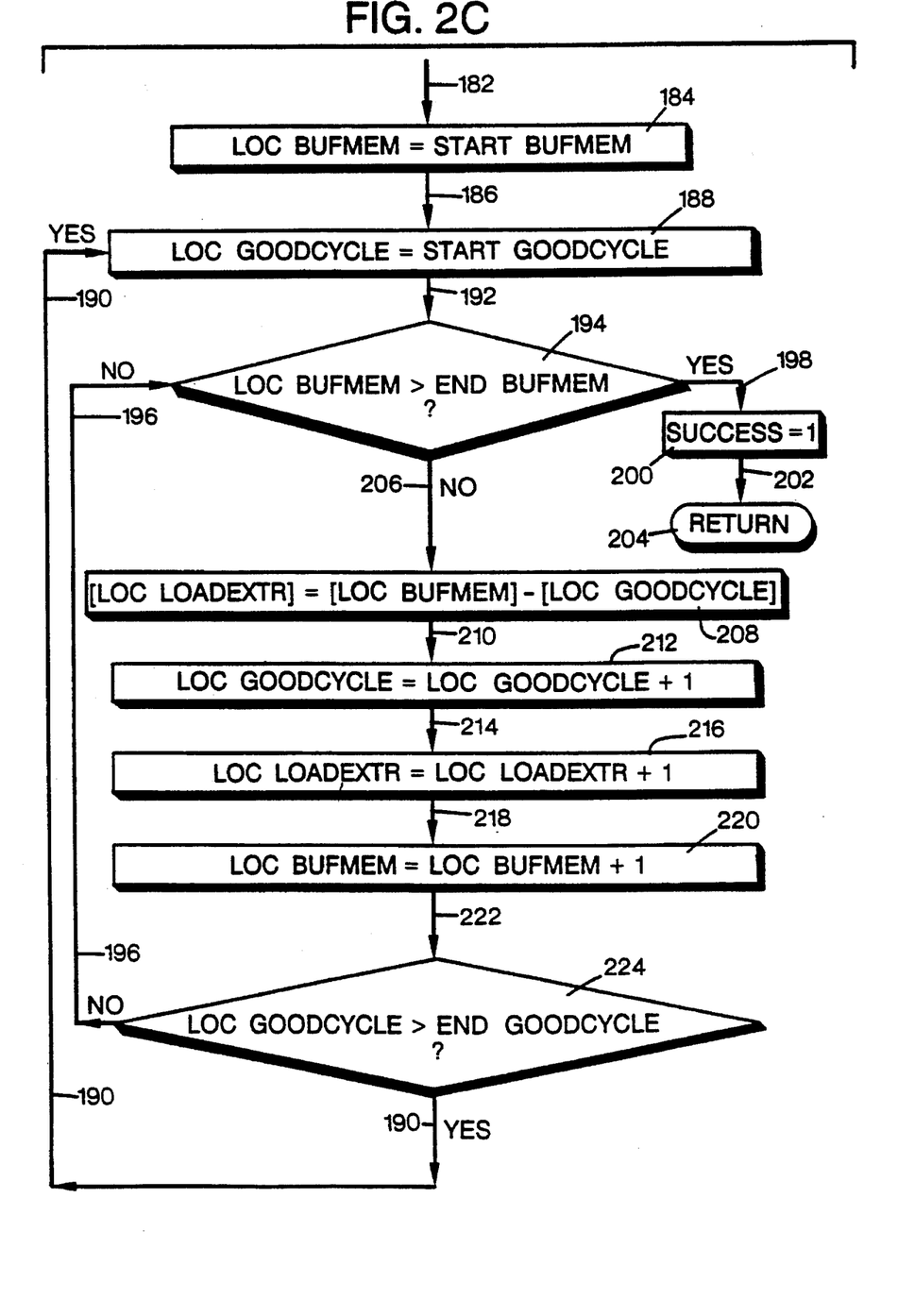

Referring now to FIGS. 2A, 2B and 2C, collectively referred to herein as "FIG. 2," a flow chart 100, in accordance with the present invention, illustrates a method of processing the sampled feeder data and one manner of operating the detector 10. This method is schematically illustrated in flow chart 100 as a series of steps or portions. A portion is defined broadly herein as a component for performing a processing step, as well as a step portion of the illustrated process, which may be implemented by hardware, software or combinations thereof known to those skilled in the art.

The detector control scheme in flow chart 100 is initialized when a START portion 102 receives a YES signal 104, indicative of a possible fault condition, from a fault analysis portion or analyzer 106. The fault analyzer 106 may be any type of a conventional fault analyzer. One preferred fault analyzer 106 is disclosed in the inventors' other concurrently filed patent applications, entitled "Load Analysis System for Fault Detection", U.S. patent application Ser. No. 08/138,144, filed Oct. 15, 1993. Alternatively, the function of fault analyzer 106 may be performed by the detector 10 in conjunction with determining a "normal load" component of the current on feeder 12.

Referring back to FIG. 1, in general, the load extraction fault detector 10 monitors parameters indicative of power flow and possible fault events on the feeder line 12. From this monitoring, detector 10 assembles a collection of data, which is stored in selected buffers or "windows," such as one of buffers 80 and 82 of RAM 52.

Figure 3:
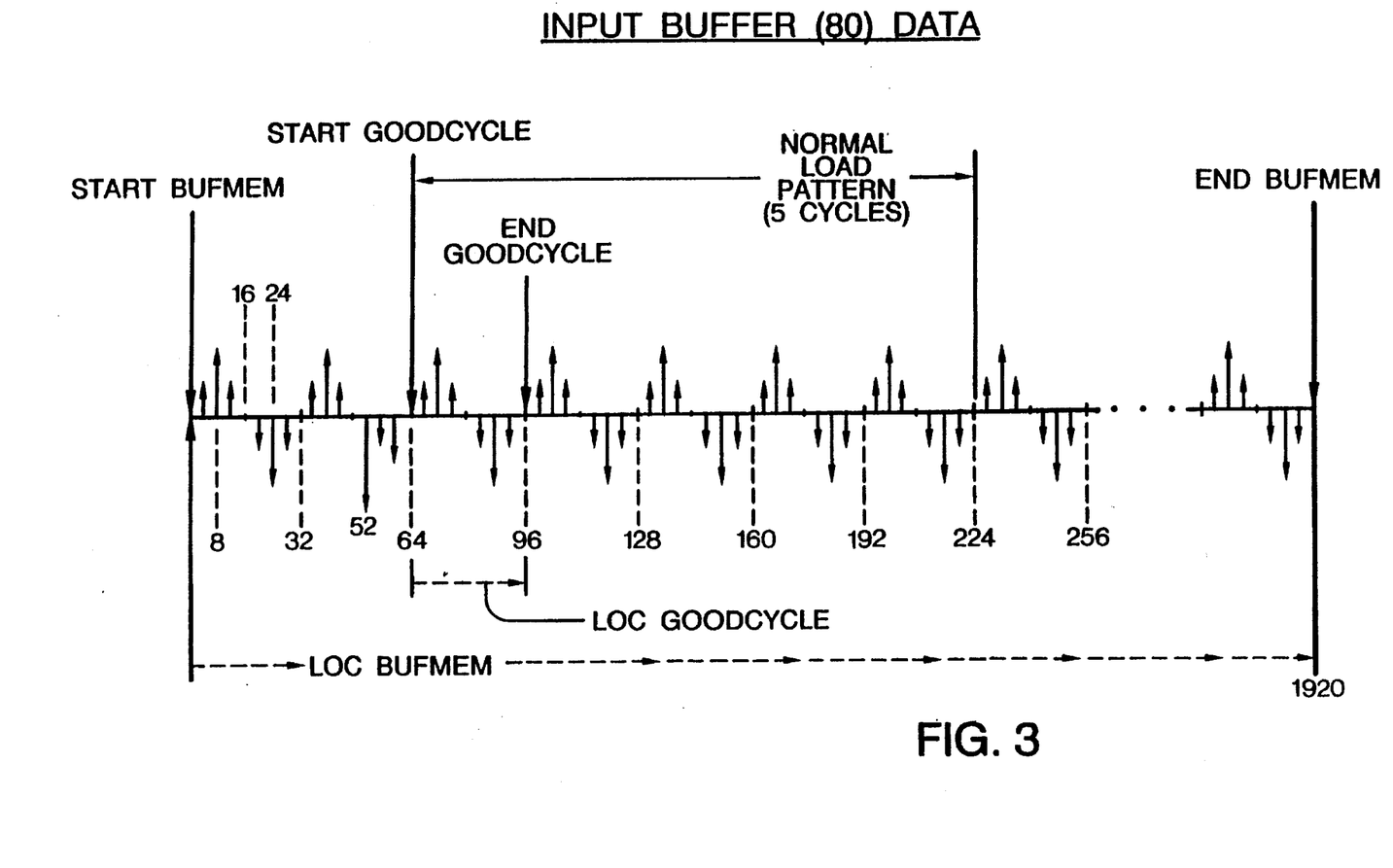
FIGS. 3 and 4 are graphs of two forms of sample points stored in the input buffer of FIG. 1, illustrating one manner of operation according to the flow chart of FIG. 2.

Referring also to FIG. 3, in the illustrated embodiment, the data window 80 serves as an input data buffer, and receives the data first from the sampler 45. Buffer 82 is an output buffer, which receives a selected portion of the data from buffer 80. The RAM 52 also has a counter buffer 84 which provides plural counting functions in response to incrementing signals, and zero resetting signals.

Figure 5:
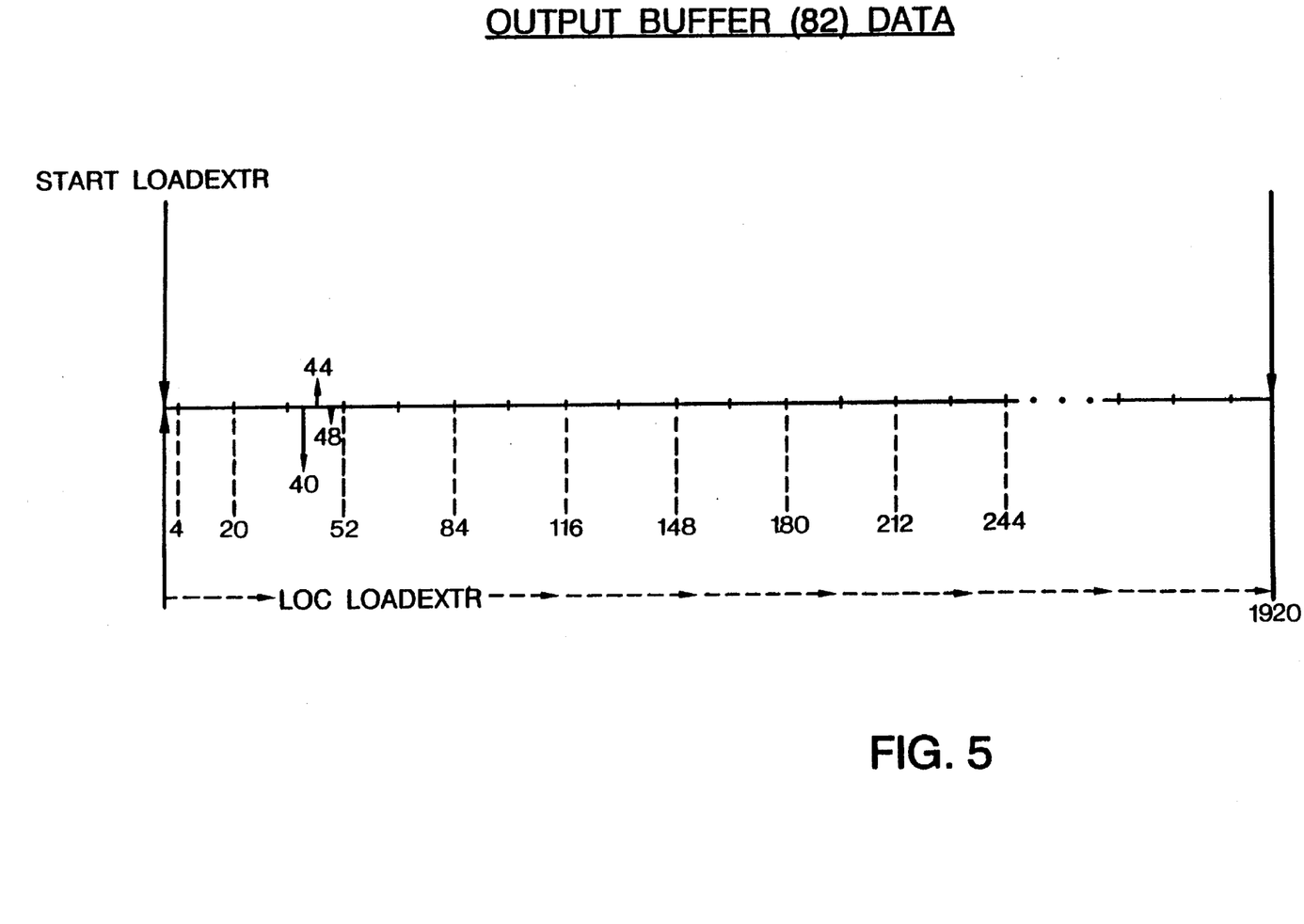
FIG. 5 is a graph of one form of sample points stored in the output buffer of FIG. 1, illustrating one manner of operation based on the FIG. 4 graph, according to the flow chart of FIG. 2.

As described further below, selected portions of the data in buffer 80 may be eventually passed on to the output buffer 82 (FIG. 5). If current is the selected parameter, the data stored in the buffers can represent the phase current, and any residual current flowing on a neutral line of feeder 12. If voltage is a selected parameter, the buffers may store data for line-to-line voltages $V_{LL}$, line-to-neutral voltages $V_{LN}$, or both.

For the current monitoring embodiment, the transducer 30 provides analog signals representing the line current for each phase, and any residual current in the neutral, which are then digitized using the A/D converter 42. This digitizing may be conducted in conjunction with the operation of sampler 45 using a selected sampling frequency rate, for instance, on the order of 1920 Hertz (Hz), which produces 32 samples for each cycle of a 60 Hz power generation system. In FIG. 3, for clarity each cycle is represented by magnitudes of only eight of the 32 samples, with the first cycle extending between zero and 32, the second between 32 and 64, etc. A similar digitizing operation may be performed if feeder voltages, rather than currents, are monitored.

As illustrated in FIG. 3, preferably, the data window input buffer 80 accommodates a fixed number of data points, such as the number of measurements corresponding to one second of data, e.g. 1920 samples for a 1920 Hz sampling frequency. The buffer capacity is also referred to herein as the "buffer length," which is particularly useful when describing a dynamic pointer function as sequentially moving through the data, from a starting point of the first-measured data value, through the end or last-measured data value. The pointer function indicates which data value is used for comparison purposes at a selected time.

The data in buffer 80 is continually updated on a rotational basis with each sampling period of the sampler 45, here by way of example, once per second. Thus, when a new group of data is added to buffer 80, it replaces the previous data group, which may be stored in another memory location or deleted. In this manner, the buffer 80 always stores a data group representing the most recent sampling of power flow through feeder 12. This data rotation advantageously allows for a continual adjustment to reflect the daily power swings from peak periods to low use periods, and to dynamically accommodate immediate load changes on the line 12.

The normal or predominant waveform in buffer 80 is determined from a criteria which uses a sample-by-sample comparison of consecutive individual waveforms for each cycle at the power system frequency. Each waveform's data stored in buffer 80 is compared with the data representing the waveform which immediately preceded it. The sampling rate of sampler 45 determines the basis of comparison on a power frequency scale. For example, if the sampling frequency rate of sampler 45 is 1920 Hz on a 60 Hz power system 20, then a total of 32 samples are compared between successive cycles.

If present, the normal load component of the waveforms in buffer 80 is determined, on a sample-by-sample basis, by identifying a number of subsequent power frequency cycles which are of the same magnitude. For example, five successive waveforms meeting a "normal load" detection criteria may be a suitable number to define a normal component. This identification begins at the start of buffer 80, that is, with the oldest data. Successive waveforms are compared by subtracting a sample point from the corresponding sample point in the previous or subsequent waveform, preferably for each sample point in the waveforms.

For example, sample point S may be subtracted from sample point S+N, where N is the number of samples per power frequency cycle (for a 1920 Hz sample rate on a 60 Hz system, the value for N is 32). Ideally, the result of this subtraction should be zero; however, a more practical implementation is to consider the points to have the same effective magnitude if the difference is less than a selected threshold $\epsilon$. It is apparent that the values selected for threshold $\epsilon$ may be different for the phase and neutral comparisons.

Since the fault current magnitude is not related to the voltage or current levels of the line 12, nor to the rated capacities of the distribution system 20, use of a proportional or percentage value as a threshold comparison could be quite unreliable. Instead, the detector 10 may use an absolute value of the monitored parameter to determine whether the waveform is normal and whether a fault has occurred. Alternatively, the detector 10 may be used with something other than a fixed threshold, such as a functional relationship based upon operational parameters.

When the corresponding frequency components for successive cycles are compared on this sample-by-sample basis, for each phase and the neutral, and if the absolute value of difference between the components is greater than a selected threshold, then an abnormality is detected. That is, the sampled waveform is not considered to be "normal," and a possible fault may have occurred. At this point, fault analyzer 106 issues the YES signal 104 to the START portion 102.

For example, on a distribution system rated below 25 kV, it may be believed with a high level of confidence that a fault has occurred when the absolute value of the current difference reaches a level of 10 Amps. Thus, when the sample-by-sample comparison of consecutive or adjacent waveforms within the data window indicates a difference having an absolute value of greater than 10 Amps, then the detector 10 determines that the waveform has failed the normal load pattern criteria.

Referring now to FIG. 2A, when it is recognized that a fault event may have occurred, the fault analyzer 106 generates the YES signal 104, and the data samples for each phase and the neutral, which were taken at the time of the event, are stored as a separate event in the input memory buffer 80 (see FIG. 3). The detector 10 uses the event data samples stored in buffer 80 to provide an accurate representation of the suspected fault component of the measured parameter. The detector 10 determines the fault component by extracting the "normal load" component of the monitored parameter from the digitized parameter waveforms stored in buffer 82, on a phase-by-phase and neutral basis. The "normal load" component refers to the predominant parameter level stored within buffer 80, as determined by the sample-by-sample comparison and absolute value criterion described above.

Upon receiving the YES signal 104, certain other information may be provided by the analyzer 106 or another portion (not shown) as inputs to the start portion 102. The transferred information may concern the values stored in the buffer 80 (buffer location, buffer length, etc.), sampling rate, a threshold level for determining normal/abnormal levels, etc. In the illustrated embodiment, these inputs are called: "START BUFMEM, LENGTH BUF, SAMPLE RATE, THRESHOLD, and NUM GOODCYCLE." This input information may be provided simultaneously or sequentially for all three phases and any neutral. In summary, the operational example discussed herein is based on the following:

TABLE 1

| Operational Example | |
|---|---|
| Parameter Monitored | Phase and Neutral Currents |
| Power System Frequency | 60 Hz |
| SAMPLE RATE | 1920 Hz = 32 samples/cycle |
| LENGTH BUF | 1 second = 60 cycles = 1920 samples |
| THRESHOLD | 10 Amps |
| NUM GOODCYCLE | 5 Consecutive cycles |

An operational example of the load extraction fault detector 10 will be discussed using load current as the monitored line parameter. It is apparent that other parameters indicative of the power flow through feeder line 12, such as voltage, may be monitored if desired. Preferably, the operations described below are conducted on a per-phase basis and on the neutral conductor, but for simplicity, the operation is illustrated with respect to a single phase unless otherwise noted.

In operation, the microcomputer system 48 generally determines a "normal load pattern" from the sampler signal 46 corresponding to the sampled line parameter values, here, current data samples. The data samples are initially stored in the input data buffer 80, which sequentially stores the incoming data in a series of memory locations. Various pointer operations or pointer devices move through the data in the input buffer 80 to identify data stored in certain locations. The locations may be identified by integers whose values may be assigned to the pointer operations.

A pointer may be a static pointer or a dynamic pointer. A static pointer may identify the same specific location, such as the beginning and ending locations of a data stream or a portion of a data stream. A dynamic pointer may move through a data stream, such as between locations established by static pointers, in response to the operations below to select various data for subsequent processing steps. For example, as shown in FIG. 3, a "START BUFMEM" static pointer identifies data located at the beginning of the data stream, that is, the oldest data in buffer 80. An "END BUFMEM" static pointer identifies the last memory location in buffer 80 where the latest data is stored.

In general, the number of data samples stored in the buffer 80, also referred to as the buffer length, may be indicated by an integer value, "LENGTH BUF." The frequency sampling rate employed by sampler 45 may also be provided to the microcomputer system 48 as an integer value, "SAMPLE RATE," which indicates how many data samples are provided per frequency cycle, illustrated as 32 samples/cycle. In the preferred embodiment, the value of SAMPLE RATE may range upward from about 480 Hz, or 8 samples/cycle, and there should be no upper limit on this range.

In the illustrated embodiment, the analysis of the data samples stored in the input buffer 80 begins when START portion 102 receives the YES signal 104 from fault analyzer 106. In response, the START portion 102 issues a start signal 108 to a first positioning portion or positioner 110. In response to the start command 108, the positioner 110 moves a "LOC BUFMEM" dynamic pointer to the storage location immediately preceding the START BUFMEM pointer position (LOC BUFMEM=START BUFMEM−1) in buffer 80. Initially, before receipt of the start signal 108, the LOC BUFMEM pointer is set to the location of the START BUFMEM pointer. It is apparent that the LOC BUFMEM pointer may be positioned to other suitable memory locations if desired by adjusting the configuration of positioner 110. After relocating the LOC BUFMEM dynamic pointer, the positioning portion 110 issues a LOC BUFMEM position signal 112 to a second positioning portion or positioner 114.

In response to position signal 112, positioner 114 moves the static pointer END BUFMEM to the last memory location of input data buffer 80. This last memory location is determined by adding the total number of memory positions in buffer 80, represented by the LENGTH BUF variable, to the beginning location indicated by the START BUFMEM pointer (END BUFMEM=START BUFMEM+LENGTH BUF).

The positioner 114 then issues an END BUFMEM signal 116 to a first initializing portion or initializer 118. The initializer 118 assigns a zero value to one counter function, designated as GOODCYCLE COUNT counter portion, in the counter buffer 84 of the microcomputer system 48 (e.g., GOODCYCLE COUNT=0) upon receipt of signal 118, or upon receipt of a first NO signal 120, generated as described below. The GOODCYCLE COUNT counter tracks the number of successive power system cycles completed which satisfy the requirements of a normal load pattern. When GOODCYCLE COUNT is reset to zero, the initializer 118 issues a new cycle signal 122 to a second initializing portion or initializer 124. The initializer 124 assigns a zero value to a counter function within buffer 84, here designated as SAMPLE COUNT counter (e.g., SAMPLE COUNT=0) upon receipt of signal 122, or upon receipt of a second NO signal 126, generated as described below.

The SAMPLE COUNT counter tracks the number of "normal" data sample comparisons within each frequency cycle. When the SAMPLE COUNT counter is set to zero, the initializer 124 sends a new count signal 128 to a first incrementing portion or incrementor 130. The incrementor 130 increments or moves the dynamic pointer LOC BUFMEM forward to the next memory location within input data buffer 80 (LOC BUFMEM=LOC BUFMEM+1) upon receiving the new count signal 128, or upon receipt of a third NO signal 132, generated as described below. When the LOC BUFMEM pointer has been incremented, the incrementor 130 issues a new location signal 134 to a first comparing portion or comparator 136.

The comparator 136 determines whether a normal load component has been found within the data stored in the input buffer 80 as the LOC BUFMEM dynamic pointer approaches the end of the compiled data stream (END BUFMEM). In response to signal 134, the comparator 136 compares the position of the LOC BUFMEM pointer with the memory position located exactly one frequency cycle before the END BUFMEM pointer location (LOC BUFMEM> (END BUFMEM−SAMPLE RATE)). If the LOC BUFMEM pointer is within one cycle of the END BUFMEM pointer and no normal load component has been found (e.g., there have not been five consecutive cycles of "good" data), then a YES signal 138 is sent to a fail flag portion 140.

In response to the YES signal 138, the fail flag portion 140 produces a fail flag signal 142. Failure to detect a normal load is indicative of detection of an arcing fault, and the resulting fail flag signal 142 may be sent by a return portion 144 to the peripheral device 70, display device 74 or alarm 78 of FIG. 1.

If the LOC BUFMEM pointer is pointing at a memory location located at least one frequency cycle before the END BUFMEM pointer location, first comparator 134 sends a NO fail signal 146 to a second comparing portion or comparator 148. Up until this point, the flow chart 100 has assigned values to the pointers, initial values to counters, and checked the dynamic pointer location within the data stream compiled in buffer 80. These pointer and counter operations are indicated in flow chart 100 without brackets. Operations on the values stored within particular memory locations are enclosed in square brackets, e.g., "[ ]" in FIG. 2.

In response to the NO signal 146, the comparator 148 begins the sample-by-sample comparison of data in sequential waveforms. For example, the comparator 148 compares the magnitude value of the data sample indicated by the LOC BUFMEM pointer with the magnitude value of the data sample positioned in buffer 80 at a location exactly one frequency cycle later. This comparison is manifested as a substraction operation, with the absolute value of the difference then being compared to a selected threshold (|[LOC BUFMEM+SAMPLE RATE]−[LOC BUFMEM] |≦THRESHOLD). In other words, comparator 148 compares the magnitude values of the current data samples pointed to by the dynamic pointer LOC BUFMEM with the corresponding magnitude values of data samples positioned within the next frequency cycle.

As mentioned above, one suitable value for THRESHOLD for a load current monitoring embodiment of detector 10 may be 10 Amps. The value for THRESHOLD may be stored in RAM 52, on hard disk 54 or occasionally supplied by the peripheral device 72. Preferably, the value of THRESHOLD is set to an integer value, however, THRESHOLD may be a non-integer or a dynamic value changing in response to system conditions, such peak versus slack load periods.

If comparator 148 determines that the absolute value of the magnitude difference between corresponding samples in successive waveforms is greater than the THRESHOLD value, the comparator 148 issues the first NO signal 120. For example, the second waveform in FIG. 3 illustrates a fault current spike at memory location 52, followed by abnormal magnitudes in locations 56 and 60. Thus, the NO signal 120 is issued when the data at locations 52, 56 and 60 is compared (the data between and possibly after these illustrated locations may also fall outside the THRESHOLD tolerance).

As mentioned above, in response to NO signal 120, the GOODCYCLE COUNT counter is reset to zero by initializer 118. Thus, the GOODCYCLE COUNT counter begins looking again for five consecutive normal waveforms (deviation less the 10 Amps) in the illustrated example. Resetting the GOODCYCLE COUNT counter causes the new cycle signal 122 to be issued to the second initializer 124, which resets the SAMPLE COUNT counter to zero, too. The initializer 124 issues the new count signal 128 to the first incrementor 130, which advances the LOC BUFMEM by one to select the next value in buffer 80 for the next iterative comparison.

If comparator 148 determines the opposite, that the resulting absolute value is within (≦) the tolerance established by the THRESHOLD value, the comparator 148 issues a YES signal 150 to indicate that a normal data point has been found. For example, beginning with the data stored in location 64 in FIG. 3, the comparator 148 begins encountering data meeting the THRESHOLD criterion. It is apparent to those skilled in the art that the data shown in FIG. 3 is given by way of illustration only, and indeed, in a practical implementation, the normal load pattern data may occur, if at all, before the fault current spike. Also, a much longer time after the spike may be required before a normal waveform is encountered. Furthermore, many more current spikes may be encountered during the 60 cycles of data stored in the input buffer 80.

The YES (normal) signal 150 is then received by a second incrementing portion or incrementor 152. The incrementor 152 responds to the YES signal 150 by advancing the value of the SAMPLE COUNT counter by one. Thus, on the following iteration, the next value in buffer 80 will be analyzed to determine if another normal value will be found.

When SAMPLE COUNT counter is incremented, the incrementor 152 sends a new sample signal 154 to a third comparing portion or comparator 156. The comparator 156 compares the present value of the SAMPLE COUNT counter to the value of the SAMPLE RATE, to determine where the LOC BUFMEM pointer is located within in a given cycle (SAMPLE COUNT≧SAMPLE RATE). If SAMPLE COUNT is less than SAMPLE RATE, the LOC BUFMEM pointer is still in the given cycle, and the third NO signal 132 is issued. In response to the NO signal 132, the incrementor 130 moves LOC BUFMEM pointer forward to the next data sample stored within buffer 80. The comparison iteration continues as long as the number of memory locations tracked by the SAMPLE COUNT counter is less than the total number of data points in a cycle (represented by SAMPLE RATE).

When the number of memory locations counted by SAMPLE COUNT reaches or exceeds the SAMPLE RATE (SAMPLE COUNT≧SAMPLE RATE), then comparator 156 sends a YES signal 158 to a third incrementing portion or incrementor 160. The incrementor 160 adds one to the value of the GOODCYCLE COUNT counter because another successful frequency cycle of data sample comparisons, here, 32 sample comparisons for the cycle, has been completed. A successful or normal frequency cycle has all data samples triggering the YES signal 150.

Upon incrementing the GOODCYCLE COUNT counter value, the incrementor issues a revised new cycle signal 162 to a fourth comparing portion or comparator 164. The comparator 164 compares the number of cycles recorded by the GOODCYCLE COUNT counter to an integer value represented by NUM GOODCYCLE (e.g., GOODCYCLE COUNT≧NUM GOODCYCLE). NUM GOODCYCLE may be a predetermined value indicative of the number of successful adjacent frequency cycles required to conclude that a normal load pattern has been detected in input data buffer 80. In the illustrated embodiment, the value of NUM GOODCYCLE is five (5) consecutive cycles.

If the value of GOODCYCLE COUNT is less than NUM GOODCYCLE, then the comparator 164 issues the second NO signal 126, indicating that a normal load pattern has not yet been established, to the second initializer 124. The initializer 124 resets the SAMPLE COUNT counter to zero, and the LOC BUFMEM pointer is moved forward by incrementor 130. The sample comparisons of subsequent frequency cycles continues because not enough normal frequency cycles have been identified to constitute a normal load pattern. The iteration by comparator 136 continues until failure to find a normal pattern is determined and the failure signal 138 is issued, or until a sufficient number of successive normal frequency cycles are identified when the value of the GOODCYCLE COUNT counter is greater than or equal to the NUM GOODCYCLE value, here, greater than five (5).

When the value of GOODCYCLE COUNT counter reaches or exceeds the NUM GOODCYCLE value (here, 5), then the comparator 164 issues a YES signal 166 indicating that a normal load pattern has been found in buffer 80. Upon finding a normal load pattern of data samples, the output data buffer 82 is ready to receive selected data from the input buffer 80 in the manner described below.

In response to the YES signal 166 indicating that a normal load pattern has been found, a third positioning portion or positioner 168 sets a START GOODCYCLE static pointer (see FIG. 3) to the beginning of the first cycle of the normal load pattern in the input buffer 80 (START GOODCYCLE= LOC BUFMEM−(NUM GOODCYCLE×SAMPLE RATE); with the "x" for multiplication being indicated by an asterisk or star in the drawing figures). If, for example, five successful frequency cycles have been completed (i.e. NUM GOODCYCLE=5), then START GOODCYCLE pointer is moved back five cycles, or 160 data samples (160 samples=5 cycles×32 samples/cycle). After the START GOODCYCLE static pointer has been moved, the positioner 168 issues a new position signal 170.

Preferably, a correlation or synchronization operation is performed to place the values in the normal load pattern in phase with the values as they were loaded into the input buffer 80. This correlation operation serves to facilitate the sample-by-sample load extraction step described below. The correlation operation given in flow chart 100 is by way of example only, and it is apparent to those skilled in the art that other equivalent routines may be implemented to arrive at the desired correlation.

Figure 4:
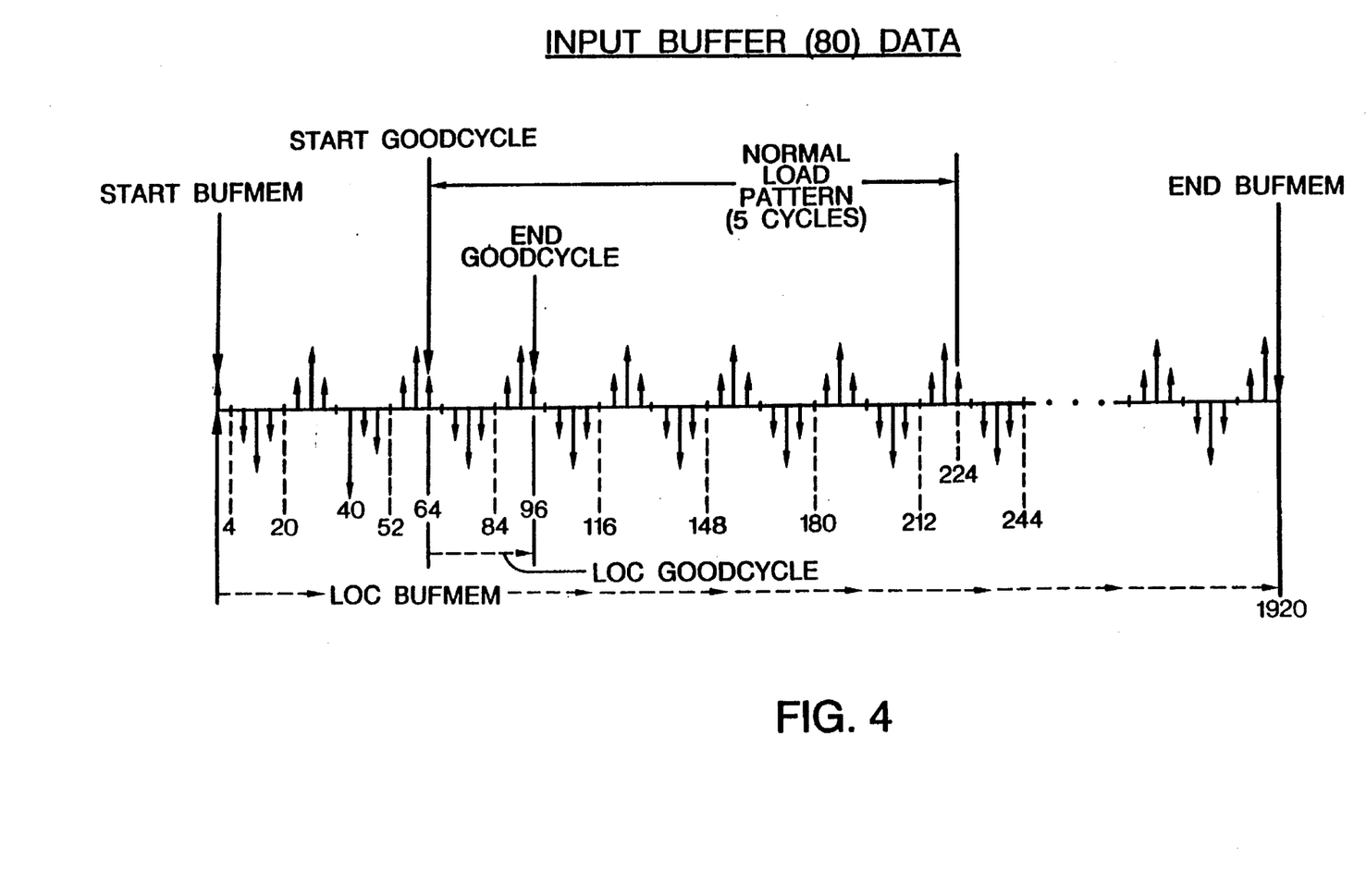

For example, instead of the first sample point at START BUFMEM occurring at a zero crossing of the waveform as shown in FIG. 3, assume it begins at a sample corresponding in phase to the twelfth (12) memory location in FIG. 3. Such a group of data needing correlation of the locations of the START GOODCYCLE and END GOODCYCLE pointers is illustrated in FIG. 4. Before correlation, the locations of the START GOODCYCLE and END GOODCYCLE pointers are at each end of the first waveform of the normal load pattern, as shown in FIG. 3. FIG. 4 shows the locations of the START GOODCYCLE and END GOODCYCLE pointers after correlation.

The signal 170 is received by a correlation portion or correlator 172 which implements the following operation to determine the new location of the START GOODCYCLE pointer:

START GOODCYCLE (FIG. 4) =
    START GOODCYCLE (FIG. 3) + {SAMPLE RATE −
        (REMAINDER {(START GOODCYCLE −
        START BUFMEM) ÷ SAMPLE RATE})} + SAMPLE RATE The disclosure refers to a "SAMPLE RATE modulus," which is the same as an integer remainder resulting from an mathematical division operation. For example, in an equation "18 modulus 4" is equal to 2, the remainder of the operation "(18÷4)." The REMAINDER is the integer result, here 2, of the modulus operation. Advantageously, if START BUFMEM is defined as zero, subtraction is not required. However, in most programming applications, a pointer points to the beginning of a block of memory, but this block cannot be assumed to be at address zero.

The "+SAMPLE RATE" at the end of the equation relates to updating of START_GOODCYCLE to point to the sample point of the second cycle in the "normal load" pattern corresponding in phase to that of the first sample point in the input data buffer. An iterative cycle is then performed. Once the value of LOC_GOODCYCLE reaches that of END_GOODCYCLE, it is reset to the value of START_GOODCYCLE, now at the second cycle of normal current. END_GOODCYCLE is also reset to the end of the second cycle of normal current.

When the location of the START GOODCYCLE pointer is synchronized in phase with that of the START BUFMEM pointer, the correlator 172 issues a new position signal 174 to a fourth positioning portion or positioner 176. The positioner 176 moves an END GOODCYCLE static pointer to the memory location located one frequency cycle beyond the memory location of the START GOODCYCLE pointer (END GOODCYCLE=START GOODCYCLE+SAMPLE RATE). Thus, the END GOODCYCLE pointer is located at the end of the first frequency cycle of the normal load pattern in the input data buffer 80. The memory locations between the START GOODCYCLE and END GOODCYCLE pointers represent the in-phase portion of the second cycle of the normal load pattern.

The fourth positioner 176 then sends a good-cycle defined signal 178 to a fifth positioning portion or positioner 180. In response to signal 178, the fifth positioner 180 moves a "LOC LOADEXTR" dynamic pointer to the storage location defined by a START LOADEXTR static pointer (LOC LOADEXTR=START LOADEXTR) in the output data buffer 82, as shown in FIG. 5.

The output data shown in FIG. 5 is generated from the input data shown in FIG. 4. Preferably, the output data buffer 82 is the same size as the input buffer 80, e.g., the length of buffer 82 is 1920 samples. As explained in detail below, the output buffer 82 stores the difference between all data samples in the input buffer 80 and the normal load pattern samples found in the input buffer 80. Use of a new buffer for the output buffer 82 prevents data stored in the input buffer 80 from being overwritten, which advantageously allows data stored in the input buffer 80 to be used in other detection systems (not shown) coupled to the detector 10.

After the LOC LOADEXTR pointer has been moved to the beginning of buffer 82, the fifth positioner 180 sends a new position signal 182 to a sixth positioning portion or positioner 184. In response to signal 182, the positioner 184 moves the LOC BUFMEM dynamic pointer to the START BUFMEM static pointer memory position, and issues a new location signal 186. Placing the LOC BUFMEM pointer at the beginning of input buffer 80 facilitates a step-by-step extraction of the magnitude values of the normal load pattern from each of the data samples stored in input data buffer 80. The values resulting from this extraction of the normal load pattern are stored in the output buffer 82 at the location indicated by the LOC LOADEXTR pointer.

In response to signal 186, a seventh positioning portion or positioner 188 moves a LOC GOODCYCLE dynamic pointer to an initial position at the START GOODCYCLE pointer. The LOC GOODCYCLE pointer is also moved to this initial position whenever the positioner 188 receives a YES signal 190, generated as described further below. The LOC GOODCYCLE pointer travels through the input data buffer 80 memory locations for the first cycle of the normal load pattern detected therein, from the START GOODCYCLE pointer to the END GOODCYCLE pointer.

When the LOC GOODCYCLE pointer has reached its initial position at the START GOODCYCLE pointer, the seventh positioner 188 issues a new position signal 192. In response to signal 192, a fifth comparing portion or comparator 194 compares the position of the LOC BUFMEM pointer with that of the END BUFMEM pointer (LOC BUFMEM>END BUFMEM). The iterative cycle described below continues until the LOC BUFMEM pointer reaches END BUFMEM pointer's location, indicating that the normal load component has been extracted from each data sample in the input buffer 80. At this point, the integer value of the LOC BUFMEM pointer is greater than that of the END BUFMEM pointer, the extraction iteration stops, and the comparator 194 issues a YES signal 198 to a success portion or success flagger 200.

In response to the YES signal 198, the success flagger 200 sends a success flag signal 202 to a second return portion 204. The return portion 204 may send the resulting success flag signal 202 to the peripheral device 70, display device 74, alarm 78 (FIG. 1), or other equivalent place known to those skilled in the art. It also may return this SUCCESS signal to another algorithm (not the subject of this disclosure) residing in the microcomputer 48.

If the comparator 194 determines that the LOC BUFMEM pointer has not reached the end of the input buffer 80 (LOC BUFMEM≦END BUFMEM), then the comparator 194 sends a NO signal 206. In response to the NO signal 206, an extraction portion or extractor 208 extracts the magnitude of the normal load component, indicated by the LOC GOODCYCLE pointer, from the magnitude of data samples indicated by the LOC BUFMEM pointer. This extraction operation is performed by substraction ([LOC LOADEXTR]= [LOC BUFMEM]-[LOC GOODCYCLE]), with the magnitudes being shown in square brackets "[ ]," as opposed to operations of relocating pointers, etc., which have no such brackets. The resulting differences, if any, between these values are stored in a memory location of buffer 82, as indicated by the LOC LOADEXTR pointer. As shown in FIG. 5, the values stored in the output buffer 82 may be either positive or negative, depending upon the relative magnitudes of the selected values. For example, the resulting magnitudes stored in FIG. 5 at data locations 40 and 48 are negative, whereas the data at location 44 is positive.

When each extraction is complete and the result is stored in buffer 82, the extractor 208 produces an extracted load signal 210. In response to signal 210, a fourth incrementing portion or incrementor 212 moves the LOC GOODCYCLE pointer forward to the next location within the first cycle normal current pattern of the input buffer 80 (LOC GOODCYCLE=LOC GOODCYCLE+1). After the LOC GOODCYCLE pointer reaches its new position, the incrementor 212 issues a new position signal 214.

In response to signal 214, a fifth incrementing portion or incrementor 216 moves the LOC LOADEXTR pointer forward to the next location in the output buffer 82 (LOC LOADEXTR=LOC LOADEXTR+1). After the LOC LOADEXTR pointer reaches the new location, the incrementor 216 issues a new position signal 218.

A sixth incrementing portion or incrementor 220 receives signal 218 from the fifth incrementor 216. Upon receiving signal 218, the sixth incrementor 220 repositions the LOC BUFMEM pointer to the next location in the input buffer 80 (LOC BUFMEM=LOC BUFMEM+1). Upon reaching its new location, the LOC BUFMEM pointer generates a new position signal 222.

A sixth comparing portion or comparator 224 receives signal 222, and then determines the position of the LOC GOODCYCLE pointer relative to that of the END GOOD- CYCLE pointer (LOC GOODCYCLE>END GOOD-CYCLE). If the LOC GOODCYCLE pointer is at a memory location preceding or the same as that of the END GOOD-CYCLE pointer, then the comparator 224 issues the NO signal 196. Upon receiving the NO signal 196, the fifth comparator 194 performs its routine, and if there is data remaining in the input buffer 80 needing the extraction operation of extractor 208, the iteration continues.

When the comparator 224 finds that the LOC GOOD-CYCLE pointer is at a location greater than that of the END GOODCYCLE pointer, then comparator 224 generates the YES signal 190. Upon receiving the YES signal 190, the seventh positioner 188 repositions the LOC GOODCYCLE pointer back to the initial position of the first cycle of the normal load pattern, that is, to the START GOODCYCLE pointer location. The iteration then continues as described above.

The resultant waveform of output data in buffer 82 represents the input data in buffer 80 from which the normal load pattern data has been extracted. It is apparent that while one input buffer 80 and one output buffer 82 have been illustrated, the detector 10 may have many such buffers for compiling a fault data history of the feeder line 12. Such a history may be useful in making future predictions about the confidence level in new fault data, such as that used by the fault analyzer portion 106 in initiating the sequence of steps illustrated in flow chart 100.

The data stored in the output buffer 82 may be used by other control portions or functions as an indicator of the presence of a high impedance low current arcing fault 24 on feeder 12. For example, the fault data in buffer 82 may be returned to display 74, alarm 78, and/or peripheral device 72 for further analysis, or to indicate the occurrence of a fault condition. In the illustrated embodiment, the resultant waveforms in the output buffer 82 are compiled by the microcomputer system 48 and the persistence of a large magnitude of the resultant waveform is used as an indicator of a low current high impedance arcing fault on feeder 12, with a resulting alarm 78 then being issued.

If too many false alarms are encountered, the level of the THRESHOLD criterion may be upwardly adjusted to increase the confidence level in the operation of detector 10. The THRESHOLD criterion may be decreased if faults reported by consumers or indicated by other detectors go unnoticed by the detector 10. The flexibility of the control scheme in chart 100 allows other adjustments of input and output buffer length by adjusting the magnitude of LENGTH BUF, and of the SAMPLE RATE.

Having illustrated and described the principles of our invention with respect to a preferred embodiment, it should be apparent to those skilled in the art that our invention may be modified in arrangement and detail without departing from such principles. For example, while the illustrated embodiment has been implemented in computer software, or discussed in terms of devices in some instances, structural equivalents of the various hardware components and devices, as well as structurally equivalent data processing routines, may be substituted as known to those skilled in the art to perform the same functions. Furthermore, while various hardware devices, such as the transducer, sampler and microcomputer system are illustrated, it is apparent that other devices known to be interchangeable by those skilled in the art may be substituted. We claim all such modifications falling within the scope of the following claims.

We claim:

1. A method of detecting faults on an AC power line, said method comprising the steps of:
   (A) sampling a power line load signal to produce a sampled load signal;
   (B) identifying a predominant waveform signal component from said sampled load signal;
   (C) comparing said predominant waveform signal component with said sampled load signal to produce a difference signal;
   (D) assessing said difference signal to identify a fault on said AC power line: and
   (E) repeating steps (A) through (D) during changing load conditions.

2. The method of claim 1 wherein said sampled load signal of said sampling step includes said predominant waveform signal component and, when a fault exists on said AC power line, a fault signal component.

3. The method of claim 2 wherein said sampled load signal of said sampling step includes a plurality of load signal cycles of said power line load signal.

4. The method of claim 3 wherein said identifying step includes the step of identifying said predominant waveform signal component with a sample-by-sample comparison of a load signal cycle to subsequent load signal cycles to identify load signal cycles with substantially the same magnitudes.

5. The method of claim 1 wherein said sampling step includes the step of storing said sampled load signal in an input buffer.

6. The method of claim 2 wherein said comparing step includes the step of comparing magnitude values of said predominant waveform signal component to corresponding magnitude values of said sampled load signal to produce said difference signal.

7. The method of claim 6 wherein said comparing step includes the step of storing said difference signal in an output buffer.

8. The method of claim 7 wherein said assessing step includes the step of assessing whether said comparing step resulted in a difference signal with magnitude values exceeding a predetermined threshold.

9. The method of claim 8 wherein said difference signal with magnitude values exceeding a predetermined threshold corresponds to said fault signal component.

* * * * *